(12) United States Patent
McGrath

(10) Patent No.: US 10,802,726 B2
(45) Date of Patent: Oct. 13, 2020

(54) OPTIMIZED PLACEMENT OF DATA CONTAINED IN A GARBAGE COLLECTED STORAGE SYSTEM

(71) Applicant: Microsoft Technology Licensing, LLC, Redmond, WA (US)

(72) Inventor: Michael Sean McGrath, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 9 days.

(21) Appl. No.: 16/173,230

(22) Filed: Oct. 29, 2018

(65) Prior Publication Data

US 2020/0133511 A1    Apr. 30, 2020

(51) Int. Cl.
*G06F 12/00* (2006.01)
*G06F 3/06* (2006.01)
*G06F 12/02* (2006.01)

(52) U.S. Cl.
CPC ............ *G06F 3/0616* (2013.01); *G06F 3/064* (2013.01); *G06F 3/068* (2013.01); *G06F 12/0253* (2013.01); *G06F 2212/1036* (2013.01)

(58) Field of Classification Search
CPC ........ G06F 3/0616; G06F 3/064; G06F 3/068; G06F 12/0253; G06F 2212/1036
See application file for complete search history.

(56) References Cited

U.S. PATENT DOCUMENTS

| 6,226,653 | B1* | 5/2001 | Alpern | G06F 12/0276 |
| 2012/0303919 | A1* | 11/2012 | Hu | G06F 12/0246 |
| | | | | 711/165 |
| 2015/0293713 | A1 | 10/2015 | Seo et al. | |
| 2017/0168929 | A1 | 6/2017 | Kanno | |
| 2017/0277438 | A1* | 9/2017 | Gole | G06F 3/0611 |

OTHER PUBLICATIONS

"International Search Report and Written Opinion Issued in PCT Application No. PCT/US19/056170", dated Feb. 4, 2020, 10 Pages.

* cited by examiner

*Primary Examiner* — Daniel D Tsui
(74) *Attorney, Agent, or Firm* — Mark K. Young; Mayer & Williams, PC

(57) ABSTRACT

A garbage collection process running on a computing device is configured to track the number of garbage collection cycles that storage fragments, called extents, are persisted in storage without being modified or deleted using a lifetime counter that is implemented using metadata. At each garbage collection cycle, the extents are sorted by lifetime values. Old extents (i.e., those existing at the start of the cycle) are bucketed together by lifetime values during garbage collection into new extents (i.e., those being created during the cycle). Thus, each of the new extents includes data having similar lifetime values. The lifetime value for the new extent equals the lowest lifetime value of the old source extent plus one additional increment on the counter. As extents are organized by garbage collection lifetime, placement on storage media can be optimized according to expected endurance requirements.

20 Claims, 10 Drawing Sheets

FIG 7

| A 705 | B 710 | C 715 | Free | Free |
|---|---|---|---|---|
| D 720 | Free | Free | Free | Free |
| 705 | | | | |

Block X
725

| Free | Free | Free | Free |
|---|---|---|---|
| Free | Free | Free | Free |
| Free | Free | Free | Free |

Block Y

FIG 8

☐ = stale data

| A 825 | B 830 | C 835 |
|---|---|---|
| D 840 | E 845 | F 850 |
| G 855 | H 860 | A' 805 |
| B' 810 | C' 815 | D' 820 |

Block X
725

| Free | Free | Free | Free |
|---|---|---|---|
| Free | Free | Free | Free |
| Free | Free | Free | Free |

Block Y

FIG 9

| Free | Free | Free | Free |
|---|---|---|---|
| Free | Free | Free | Free |
| Free | Free | Free | Free |

Block X
725

| Free | Free | F 930 | A' 905 | D' 920 |
|---|---|---|---|---|
| Free | E 925 | H 940 | C' 915 | |
| Free | G 935 | B' 910 | | |

Block Y
945

OPTIMIZED PLACEMENT OF DATA CONTAINED IN A GARBAGE COLLECTED STORAGE SYSTEM

BACKGROUND

Solid state drives (SSDs), such as flash storage, offer benefits over traditional hard disk drives (HDDs). For example, SSDs are often faster, quieter, and draw less power than their HDD counterparts. However, there are also drawbacks associated with SSDs. For example, data can only be erased from the SSD in blocks, also known as "erase blocks." These erase blocks may contain, in addition to data that a user wishes to delete, stored data that the user wishes to persist on the SSD. To delete the unwanted data, the SSD performs a process known as "garbage collection" to move data around on the SSD so that the persisted data is not erased. Due to physical characteristics of their storage media, SSDs only have a limited number of write-erase cycles after which a given region of SSD memory cannot be rewritten. High rates of data churn, in which new data is written to an SSD and old data is deleted can significantly contribute to SSD wear and thus increase costs for SSD users and storage solutions providers. SSDs are available that support varying amounts of write-erase cycles (referred to as "endurance"). SSDs with higher endurance are typically more expensive than their lower endurance counterparts and provide lower storage density.

SUMMARY

A garbage collection process running on a computing device is configured to track the number of garbage collection cycles that storage fragments, called extents, are persisted in storage without being modified or deleted using a lifetime counter that is implemented using metadata. At each garbage collection cycle, the extents are sorted by lifetime values. Old extents (i.e., those existing at the start of the cycle) are bucketed together by lifetime values during garbage collection into new extents (i.e., those being created during the cycle). Thus, each of the new extents includes data having similar lifetime values. The lifetime value for the new extent equals the lowest lifetime value of the old source extent plus one additional increment on the counter. As extents are organized by garbage collection lifetime, placement on storage media can be optimized according to expected endurance requirements. Thus, extents with larger lifetime values, which have persisted more garbage collection cycles, can be placed on lower endurance media as such data is stable and less likely to be modified or deleted by a device user. Extents with smaller lifetime values, which are less stable and more likely to be churned, can be placed on higher endurance media. The range of lifetime values associated with each bucket and the overall number of buckets being utilized can vary to implement differing levels of data placement granularity.

The optimized placement of data on storage media according to endurance provides significant advantages over conventional storage management processes where garbage collection is typically performed opportunistically without consideration given to coalescing extents according to their persistence across garbage collection processes. Computing system performance is enhanced because data with similar garbage collection lifetimes are bucketed together on the storage media which can improve the efficiency of the garbage collection process. For example, by bucketing together extents that are relatively more transient (i.e., more likely to be churned), the block erases that are utilized during garbage collection are more likely to be erasing "dirty" data in the bucket that is stale and no longer useful. Storage media holding extents which are relatively more stable and less transient can undergo fewer block erases since less data becomes dirty over time. Thus overall, the computing device needs to perform fewer block erases to reclaim space across the collective storage media compared with conventional garbage collection processes. In addition, cost benefits can be realized by enabling the endurance of the storage media to be well matched to their expected use. For example, less durable and lower cost types of storage media can be utilized for data that is more stable and less transient. More durable and higher cost types can be deployed in a concentrated manner for placement of transient data that is subject to higher rates of churn.

The present optimized placement of data can also be advantageously utilized with storage systems that are implemented with a media of a single type, or that have substantially similar endurance characteristics. For example, a storage system using a single media type such as quad-level cell (QLC) NAND-based SSDs has improved computing system performance compared with conventional systems because the present garbage collection method can be performed relatively less frequently when reclaiming storage space. In addition, the efficiency of the present garbage collection method reduces wear on the storage media—fewer write-erase cycles are needed because block erases are more likely to target dirty data. For similar reasons, the present optimized placement of data can also be advantageously utilized with storage systems having magnetic storage media such as hard disk drives (HDDs) that feature shingled magnetic recording (SMR).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 7, 8, and 9 show an illustrative example of a garbage collection process;

Like reference numerals indicate like elements in the drawings. Elements are not drawn to scale unless otherwise indicated.

DETAILED DESCRIPTION

Figure 1:
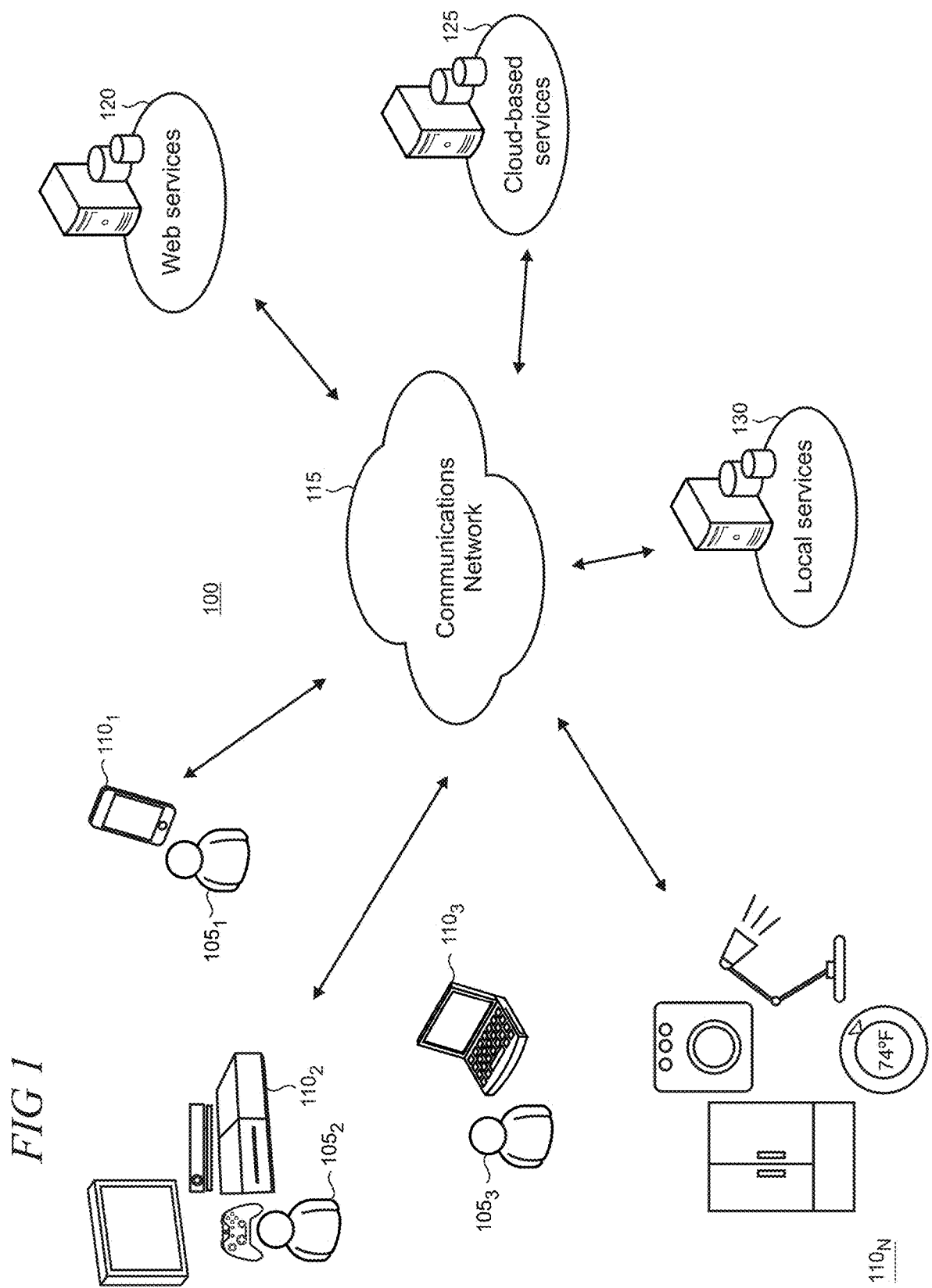
FIG. 1 shows an illustrative computing environment in which various of computing devices interact with services over a communications network.

FIG. 1 shows an illustrative computing environment 100 in which the same or different users 105 may employ various devices 110 that communicate over a communications network 115 to access services, applications, and data that are supported by one or more of providers of local services 130, cloud-based services 125, and web services 120. The devices 110 may utilize locally-implemented data storage or remotely-implemented data storage as they operate, either alone, in combination with other devices, or in combination with the services. The devices 110 can be utilized by individual users 105 or be organized as part of an enterprise in which the users are members or employees of the enterprise.

The devices 110 can support voice telephony capabilities in some cases and typically support data-consuming applications such as web browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices may also be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), smart speakers, IoT (Internet of Things) devices, smart appliances, connected car devices, smart home hubs and controllers, desktop computers, multimedia consoles, gaming systems, or the like. In the discussion that follows, the use of the term "device" is intended to cover all devices that employ some form of data storage, whether it be implemented locally, remotely, or by a combination of local and remote storage.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

The devices 110 can typically utilize the network 115 to access and/or implement various user experiences. The network can include any of a variety of network types and network infrastructure in various combinations or sub-combinations including local-area networks (LANs), wide-area networks (WANs), cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The network 115 may utilize portions of the Internet (not shown) or include interfaces that support a connection to the Internet so that the devices 110 can access content and render user experiences provided by various remote or cloud-based services 125 and web services 120. The cloud-based services 125 and web services 120 can support a diversity of features, services, and user experiences such as social networking, mapping, news and information, entertainment, travel, productivity, finance, etc.

Figure 2:
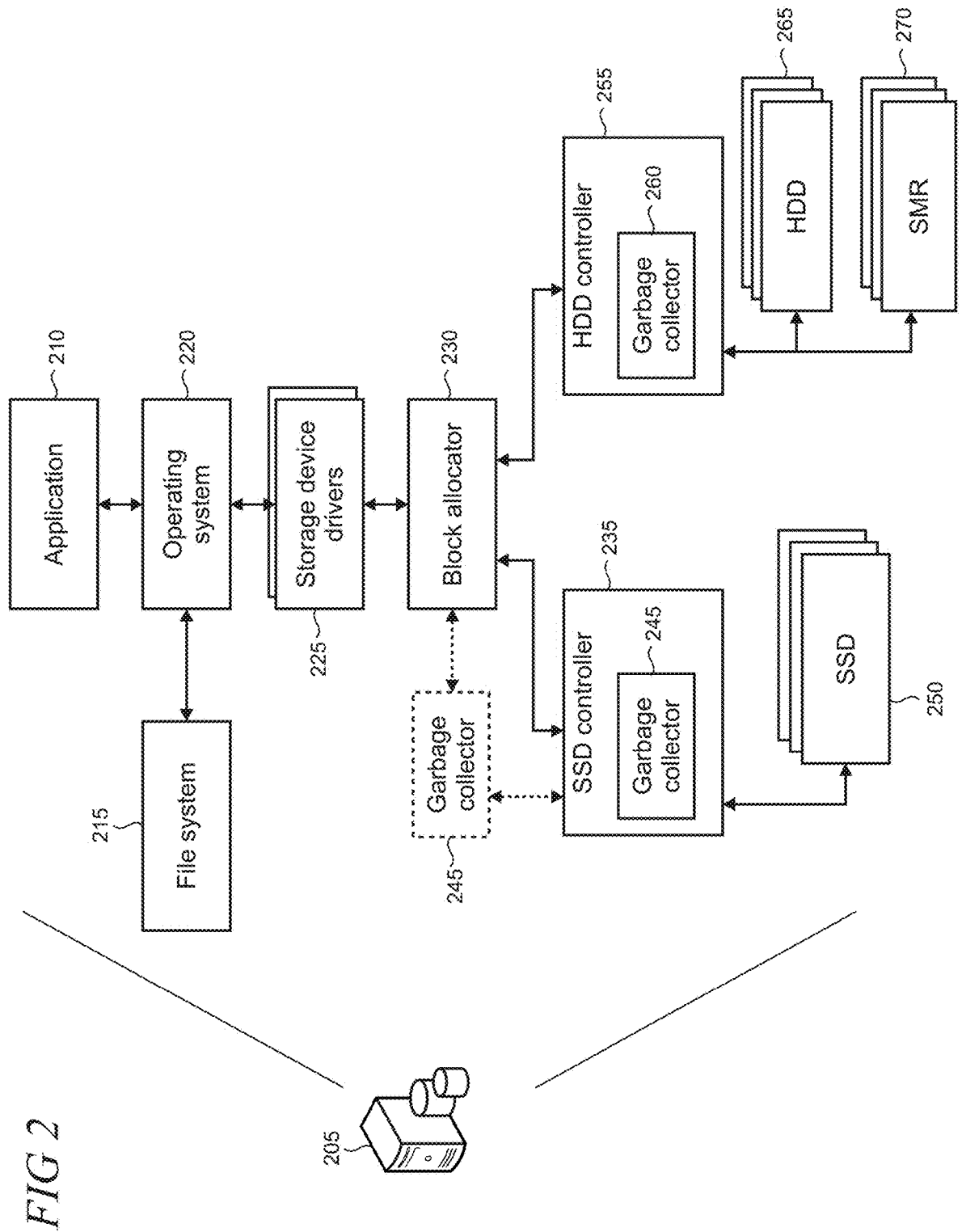
FIG. 2 shows illustrative components of a computing device that are configured to support the present optimized placement of data contained in a garbage collected storage system.

FIG. 2 shows illustrative components of a computing platform 205, such as a locally operated personal computer or remotely operated server, that are configured to support the present optimized placement of data contained in a garbage collected storage system. For example, the computing platform 205 may be a storage server that is part of a computing system that is employed by a provider of cloud-based services 125 (FIG. 1).

The components of the computing platform 205 are illustrative examples of components that may be associated with, or included in, a computer-implemented data storage system for reading, writing, and erasing data to one or more data storage media. As shown, the components are arranged in several layers of abstraction, each of which plays a role in improving overall performance of the platform's data storage system performance and management. The components include an application, file system, operating system, device drivers, block allocator, garbage collector, and storage media and associated controllers. While the components are shown as being instantiated on the computing platform 205, it is noted that one or more of them may be instantiated on one or more other computing devices in a distributed computing arrangement. For example, an application can be implemented using fully local processing, fully remote processing, or using a combination thereof. Each component is described in detail below.

In the top layer of the computing platform 205, an application 210 is illustrative of any application through which a user 105 may create, edit, modify, store, save, delete, or otherwise manipulate data of various types and quantities. An operating system 220 is illustrative of a hardware device, firmware system, software system, or combination thereof that is operative to control input and output to and from the computing platform, and for serving as an interface between application 210 and local and peripheral operations of the computing platform and/or other computing devices, components, or equipment that may operate with the platform.

The file system 215 is illustrative of one or more files accessible by the operating system 220 containing information used for controlling how data is stored, how space is allocated in a granular manner, and is responsible for organizing the storage of data on one or more storage devices, as described below. For example, when a data item is created via an application 210, the file system 215 may be queried for information necessary for allocating storage space for the data. For example, the file system 215 may be utilized for allocating space in a solid state drive (SSD), hard disk drive (HDD), or other memory devices on which components of the data at different levels of granularity may be stored.

The storage device drivers 225 are illustrative of a device, device firmware software, or combination thereof that operates, interfaces with, or controls one or more data storage media comprising, for example one or more SSDs 250 or magnetic recording HDDs 265, as described below. Each driver 225 may serve as a software or hardware interface to respective storage devices for enabling the operating system 220 or other applications to access the functions of the data storage media without needing to know operating details of the devices. That is, a storage device driver 225 acts as a translator between the operating system 220 and the data storage media 250 and 265. In a typical host/device environment, the device drivers may serve as a host to the storage media 250 and 265 for interfacing with the media to pass instructions to and receive output from the media.

The block allocator 230 may be implemented as a device, device firmware or software application operative to interface between the host or drivers 225 and the storage media 250 and 265. The block allocator 230 is responsible for directing the storage of data to particular storage blocks/pages of the SSD or sectors/zones of the HDD. For example, storage of sequential data writes to small multiple blocks may be utilized rather than to large contiguous regions of the storage media 250 and 265. In addition, the block allocator 230 may direct the respective storage media controllers 235 and 255 to perform device management operations, as described herein, and may also, for example, expose sequential writes of many small logs back up to the file system 215. In some implementations, for example, when only an SSD is utilized in a computing system, the block allocator may not be implemented in the computing platform 205 or may be configured to direct data solely to the SSD.

Beneath the storage device drivers 225 and block allocator 230 are illustrated two types of data storage media. Any number of data storage devices may be utilized by a given computing device, platform, or system for storing data, including solid state storage devices, magnetic recording media devices, optical recording devices, magnetic tape recording devices, and the like. In this illustrative example, the storage media include solid state recording devices and magnetic recording media devices.

The SSD 250 is illustrative of a non-volatile memory medium onto which data may be persistently stored on one or more integrated circuit chips, boards, or assemblies contained in the solid state memory device. Typical SSDs may be operated as NAND-based devices or may be operated as NOR-based devices, or may utilize a variety of other solid state technologies such as phase change memory (PCM), spin torque transfer (STT), and the like. SSDs, sometimes also referred to as flash drives, may be operated internally in a device. In addition, SSDs may be operated externally to a device and may be plugged into or otherwise attached to a device, such as the attachment of a universal serial bus (USB) flash drive for storing data as described herein.

The SSD controller 235 is illustrative of a controller device, device firmware, software, or a combination thereof that is associated with or incorporated into the solid state storage media. The SSD controller receives instructions from a storage device driver 225 for reading, writing, and erasing data to/from the SSD 250 and for controlling operations of the device including various memory device management functions. Such memory functions may include error-correcting code functions (ECC) for managing the correction or recovery of data when errors are introduced to data transmitted to or stored on a solid state memory device. Another function performed by the SSD controller 235 may include conventional wear leveling, which includes the management of data storage and data erasure applied to the various blocks or pages available on the solid state device for maximizing the available lifetime of the device by evenly distributing data writing and erasure among available storage blocks or pages.

Other management functions performed by the SSD controller 235 include bad block or bad sector management, whereby blocks or pages on which data may be stored that are found to be defective or otherwise inaccessible are mapped and designated by the controller so that such bad blocks or sectors may be bypassed in future read/write/erasure operations. Additional functions that may be performed by the SSD controller 235, in whole or part, include garbage collection and data encryption.

Garbage collection is performed by a garbage collector 245 that performs various operations in an interoperative relationship with the SSD controller 235 for identifying and removing pieces of data from memory that are no longer in use by a given application 210 or operating system 220 so that memory occupied by such pieces of data may be reclaimed for use in other data read/write operations. The garbage collector performs the garbage collection process described in the text accompanying FIGS. 7, 8, and 9, and the present optimized data placement as described in text accompanying FIG. 12. The garbage collector 245 can be incorporated as an internal functionality in the SSD controller 235 or be implemented as a standalone component that interfaces with one or more other components, such as the SSD controller 235 and block allocator 230, as indicated by the dashed lines in FIG. 2.

Data encryption performed by the SSD controller 235 may include operations performed on data for formatting or structuring the data such that it may only be accessed, read, modified, or erased by authorized persons. The foregoing functions that may be performed by the SSD controller are illustrative and not exhaustive of all functions that may be performed with respect to the SSD 250.

The HDD 265 is illustrative of a typical hard disk drive storage device with which data may be stored on track sector (zones) of a hard disk or platter contained in the device. The HDD controller 255 may direct data storage read, write, and erasure operations, as well as data management operations such as logical to physical storage media mapping, data encryption, error-correcting code (ECC) operations, bad block mapping, wear leveling, garbage collection, read and write caching, etc., as described above with reference to the SSD 250. The HDD controller is illustrated as separate from the HDD, but alternatively may be integrated with the HDD. Various magnetic recording media may be implemented in the computing platform 205 according to a variety of different device implementations including HDDs, shingled magnetic recording (SMR) drives, tape drives, and the like.

The SMR media 270 is a variation of an HDD that provides for tracks on a platter that are layered on top of each other to increase platter density. The SMR media can be deployed as standalone storage media or to supplement other types of storage media in a storage system. The SMR media is shown in FIG. 2 as being controlled by the HDD controller 255, but a separate and/or dedicated controller may also be utilized in some implementations. In this illustrative example, the HDD controller includes a garbage collector 260 that is configured to apply enhanced garbage collection methods to the SMR media.

The SMR media 270 uses a system of zones that are functionally similar to erase blocks in the SSD 250 (as described below in the text accompanying FIGS. 6-9) as they must be completely erased before being rewritten. Each SMR zone is typically sized at 256 MB so it is larger than each extent that is stored in it.

Figures 3, 4:
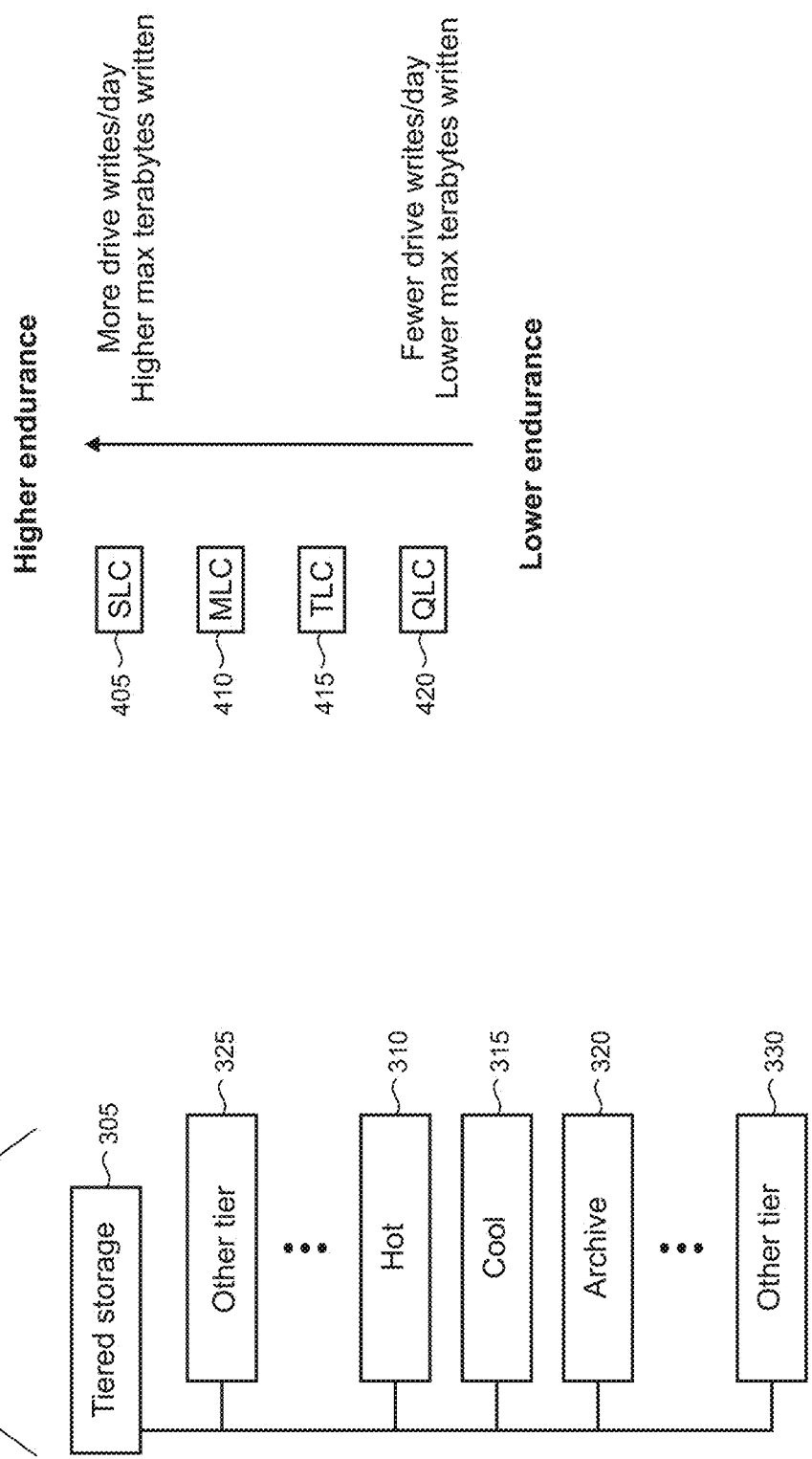
FIG. 3 shows an illustrative tiered storage arrangement that may be utilized by a computing device when configured as a server.
FIG. 4 shows illustrative types of memory elements that are used in solid-state drives (SSDs) that have varying levels of endurance.

The computing platform 205 may be configured to support data storage using a hierarchical, or tiered storage arrangement 305, as shown in FIG. 3. The storage tiers illustratively include a hot tier 310, cool tier 315, archive tier 320, and other tiers 325 and 330 that may be placed anywhere in the hierarchy. Tiers are commonly provided in cloud-based and other commercial storage solutions to help customers manage storage in a cost-effective manner. Data storage in the tiers is typically organized based on attributes like frequency-of-access and planned retention. For example, data stored in the tiers can be different in terms of how it is generated, processed, and accessed over its lifetime. Some data is actively accessed and modified throughout its lifetime. Some data is accessed frequently early in its lifetime, with access dropping drastically as the data ages. Some data remains idle in the cloud and is rarely, if ever, accessed once stored.

Configuration of the tiers may thus be optimized for the frequency of data access by the customer. Thus, the hot tier is optimized for storing data that is accessed frequently; the cool tier is optimized for storing data that is infrequently accessed; and the archive tier is optimized for storing data that is rarely accessed. The tiering of data access can also take length of storage into account. For example, the cool tier may be used for data that has been stored at least 30 days, and the archive tier may be used for data that has been stored for at least 180 days.

Customers can manage storage solution costs by selecting the appropriate trade-offs between access and storage. For example, the cool tier 315 may provide for slightly lower availability, but still typically requires high durability and similar time-to-access and throughput characteristics as data stored in the hot tier 310. For cool data, lower availability and higher access costs compared to hot data are acceptable trade-offs for lower storage costs. Storage in the archive tier 320 is typically supported offline, for example using magnetic tape storage media, and offers the lowest storage costs but also the highest access costs.

As shown in FIG. 4, a given SSD can be configured with different types of NAND-type memory elements to implement data storage that meets the endurance requirements for a given application. The memory elements shown are illustrative and other types of memory can be used to meet the needs of a particular implementation including non-NAND type memory. An SSD can use a single type or multiple types of memory elements. The elements shown in FIG. 4 include single-level cell (SLC) 405, multi-level cell (MLC) 410, triple-level cell (TLC) 415, and quad-level cell (QLC) 420 which respectively store 1, 2, 3, and 4 bits of information per cell. The SLC provides the greatest durability relative to the other memory element types. The QLC provides the least durability relative to the other memory element types.

Because of the physical characteristics of NAND-type memory, writing is a destructive process in which the integrity of each cell is slightly damaged when it is written. This means that the memory elements are not infinitely durable and have a finite lifetime for writes—a feature referred to as endurance that is typically expressed in drive writes per day, maximum terabytes written, or maximum number of program/erase (P/E) cycles. Typical P/E cycles are around 100,000 for SLC, 10,000 for MLC, 3,000 for TLC, and 1,000 for QLC, although there is wide variation among vendors.

Figure 5:
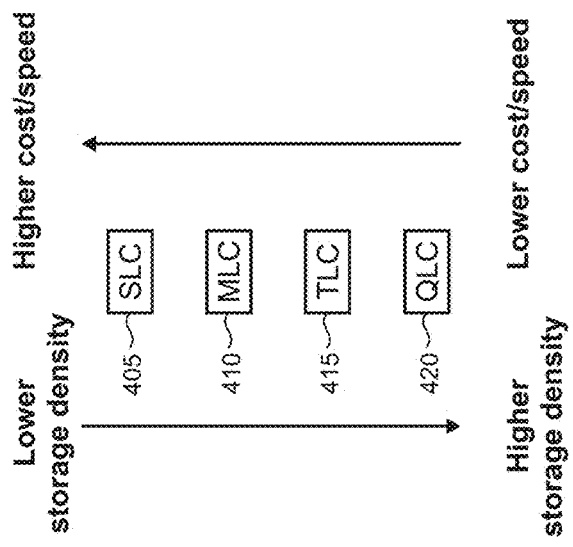
FIG. 5 shows illustrative types of memory elements that are used in SSDs that have varying costs and storage density.

FIG. 5 shows other characteristics of the memory elements. As shown, the SLC 405 is typically costlier with lower storage density relative to the other memory element types. The QLC 420 provides lower relative costs with higher relative storage density. Other attributes of the SLC include faster relative access speeds.

Figure 6:
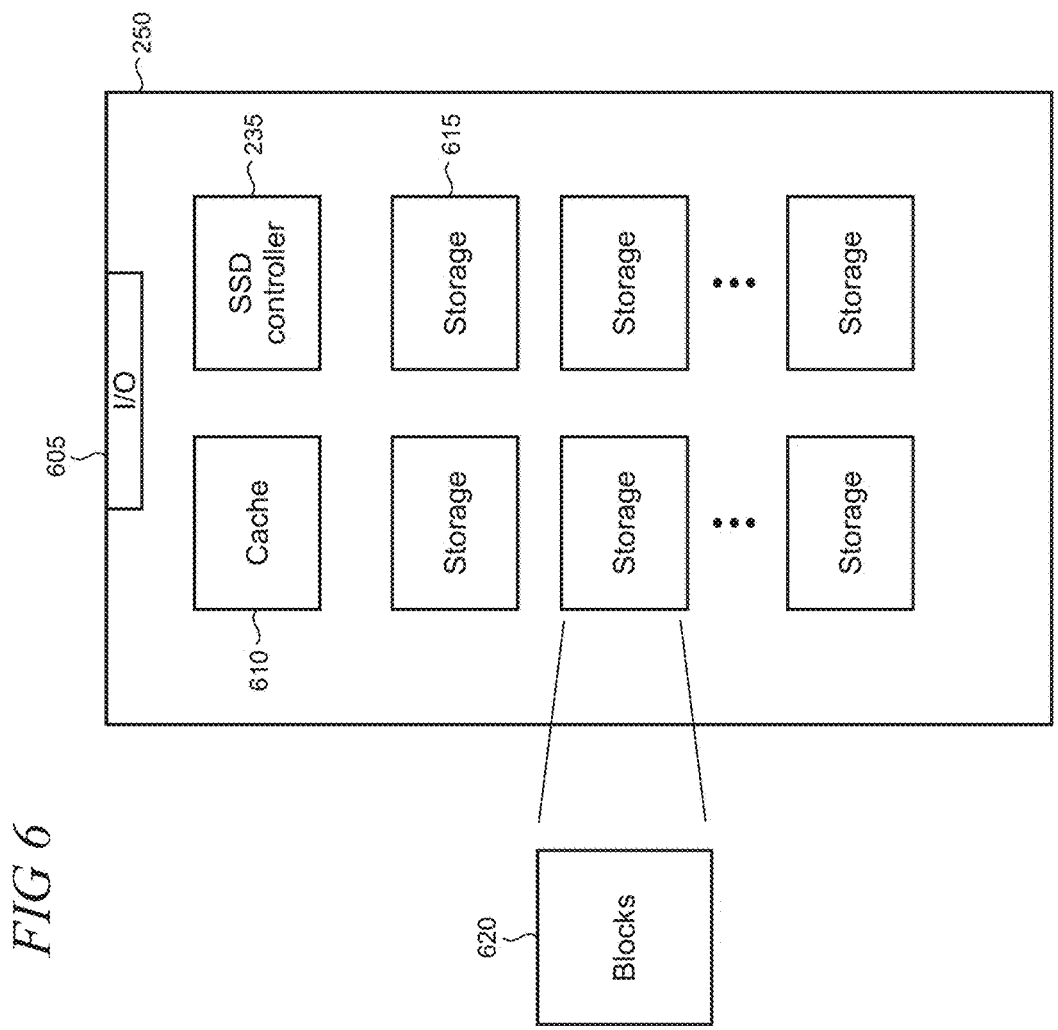
FIG. 6 shows a block diagram of an internal view of an illustrative SSD.

FIG. 6 shows a block diagram of an internal view of an illustrative SSD 250. An input output (I/O) device or module 605 is an illustrative example of an interface with which the SSD device 250 is operatively connected to the storage device driver 225 (FIG. 2) for data I/O to and from the SSD. The SSD controller 235 is shown as an integrated circuit (IC) chip or card mounted inside the SSD 250 for controlling the operations of the device, as described above. A cache chip or card 610 is an illustrative example of an IC chip or card contained in the SSD that is configured for temporarily storing data and/or instructions to and from the SSD controller and output from the SSD in association with read/write operations to flash storage (representatively indicated by reference numeral 615).

Flash storage 615 may include one or more ICs or cards disposed in the SSD 250 in which data is stored, read, written to, and erased at the direction of the SSD controller 235. Blocks 620 represent individual storage zones included in one of the flash storages at which data may be stored, read from, or erased, as described herein.

FIGS. 7, 8, and 9 show an illustrative example of a garbage collection process. Unlike the HDD 265 (FIG. 2), the NAND-based flash storage 615 (FIG. 6) cannot overwrite existing data and old data must first be erased before writing new data to the same location. As noted above, a similar issue is faced by the SMR media 270 as SMR zones must first be erased before writing new data to the same location. Garbage collection is the name for the process applicable to each of the SSD 250 and SMR media 270 for relocating existing data to new locations and allowing the surrounding invalid data to be erased. The garbage collection process is illustratively shown and discussed below for the erase blocks in the flash storage 615 in the SSD, but the described principles may also be applied to SMR zones in the SMR media.

The flash storage 615 (FIG. 6) is divided into blocks, which are further divided in pages. Data can be written directly into an empty page, but only whole blocks (termed "erase blocks") can be erased. To reclaim the space taken up by invalid (i.e., stale) data, all the valid data from one block must be first copied and written into the empty pages of a new block. Only then can the invalid data in the original block be erased, making it ready for new, valid data to be written.

The process is illustrated in FIG. 7. Pages A through D (respectively indicated by reference numerals 705, 710, 715, and 720) are written to block X (725). Individual pages can be written to so long as they are free (i.e., already erased). Sometime later, that data is modified by the user, so pages A' through D' (805, 810, 815, and 820) are written and the original pages A through D are marked invalid (825, 830, 835, and 840), as shown in FIG. 8. At the same time, additional data is written to pages E through H (845, 850, 855, and 860). Block X is full but is holding space for now stale data (pages A through D) which cannot be reclaimed until the whole block is erased.

To reclaim the storage space occupied by the stale data, the valid data in block X must be moved to a new block so that block X can be erased to start over. FIG. 9 shows the data from pages A' through D' (905, 910, 915, and 920) and E through H (925, 930, 935, and 940) being written to a new block Y (945), so the space from block X (725) can be reclaimed by erasing it.

This reclamation process is conventionally referred to as garbage collection. It is noted that some form of wear leveling is typically implemented during garbage collection so that data is written to a variety of new blocks to thereby spread wear over the breadth of the flash storage and/or entire SSD. Since there are a limited number of writes the flash storage can sustain over its lifetime, as discussed above, if data was always written to the same block, its life of write cycles would be exhausted prematurely compared to all other blocks. This continued early block retirement would eventually reduce the available capacity of the SSD and prevent it from performing at its full capability. Ideally, all of the blocks of the SSD need to be worn at the same rate throughout the life of the drive. Wear leveling can be implemented in some cases using a dedicated wear leveling component in the SSD or be incorporated as a functionality within the SSD controller. The present optimized placement of data can be implemented in parallel with conventional wear leveling methodologies.

Figure 10:
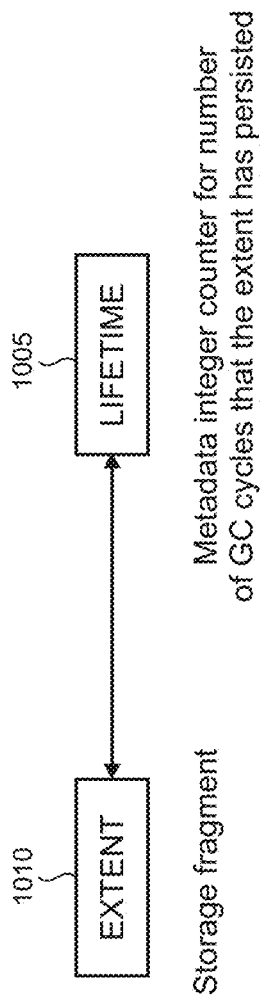
FIG. 10 shows a metadata lifetime counter attached to a storage fragment.

The present optimized placement of data in a garbage collected storage system tracks the number of garbage collection cycles that data has endured without becoming stale and being erased. FIG. 10 shows a metadata lifetime counter 1005 attached to a storage fragment 1010 called an extent. An extent is a contiguous area of storage reserved for a file in a file system. A file can consist of zero or more extents and one file fragment requires one extent. The metadata counter is expressed as an integer and is incremented by one count for each garbage collection cycle that an extent is persisted, as discussed in the text accompanying FIG. 12 below.

Figure 11:
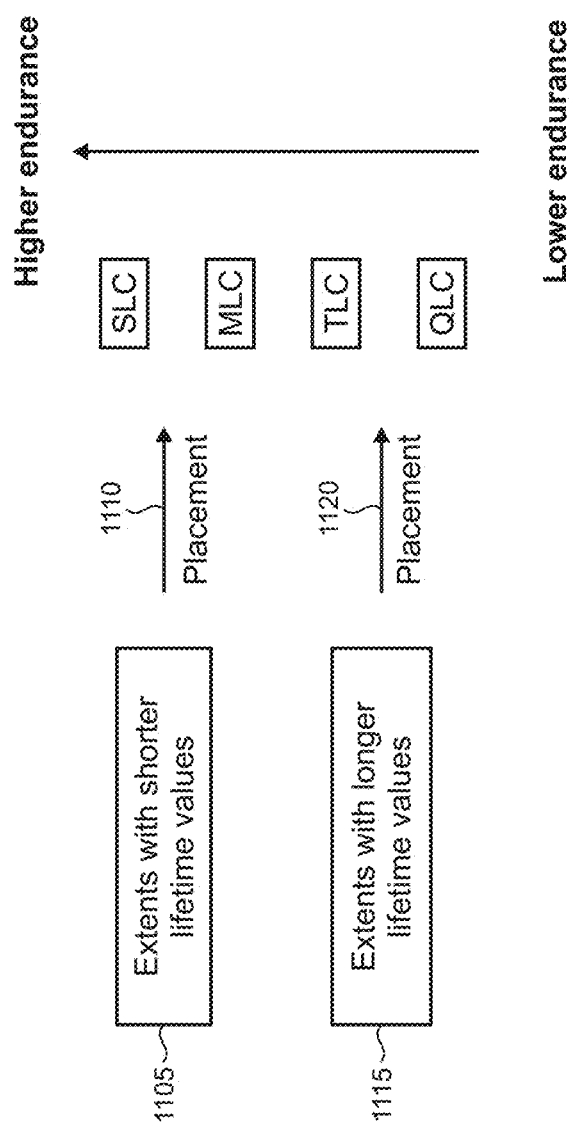
FIG. 11 shows an illustrative optimized placement of extents across memory elements having different endurances.

Tracking the garbage collection lifetime enables the extents having similar lifetime values to be bucketed together and then placed on storage media having endurance characteristics that optimally match the expected requirements for access and storage length for that data. As shown in FIG. 11, extents that are included in a bucket 1105 of shorter lifetime values can be placed on storage media that include relatively higher endurance memory cells, as indicated by arrow 1110. Extents that are included in a bucket 1115 of longer lifetime values can be placed on storage media that include relatively lower endurance memory cells, as indicated by arrow 1120.

While FIG. 11 shows two buckets, as noted above, various numbers of buckets can be utilized in a given implementation. The similarity in lifetime values for extents to be bucketed together can also vary by implementation. In addition, the granularity of storage media endurance can also vary. In some cases, the storage media can be divided into two groups having relatively higher and relatively lower endurances. In other cases, one or more intermediate levels of endurances may be utilized. The storage media utilized is not limited to SSDs and may include other types including magnetic and optical storage media.

Figure 12:
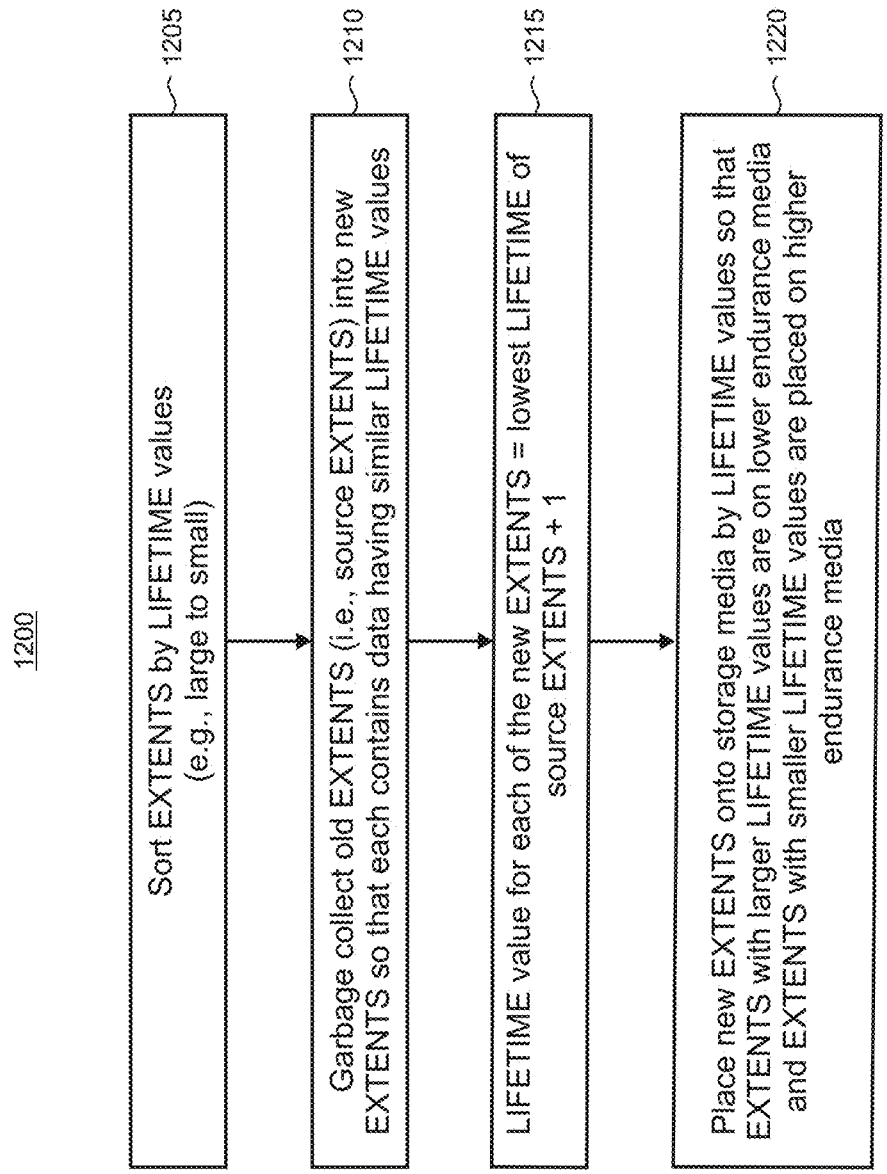
FIG. 12 is a flowchart of an illustrative garbage collection process that implements the present optimized placement of data contained in a garbage collected storage system.

FIG. 12 is a flowchart 1200 of an illustrative garbage collection process that implements the present optimized placement of data contained in a garbage collected storage system. Unless specifically stated, the methods or steps shown in the flowchart and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

The flowchart 1200 illustrates a process that may be utilized for each garbage collection cycle. An operating system on a given computing device typically triggers garbage collection as needed to reclaim storage that is occupied by stale data. For example, garbage collection may be triggered to meet predetermined criteria for free storage space. The file system 215 (FIG. 2) may also trigger garbage collection as part of its routine operations. At step 1205, extents are sorted by lifetime values, for example from large to small. As noted above in the text accompanying FIG. 10, each extent in a storage system has an attached piece of metadata that works as an integer counter that is incremented each time an extent is persisted across a garbage collection cycle.

At step 1210, old extents (i.e., those that existed prior to this garbage collection cycle) are garbage collected into new extents (i.e., those being created during this garbage collection cycle) so that each of the new extents includes data having similar lifetime values. As discussed above, the degree of lifetime similarity for extents to be coalesced can vary by implementation so that the number of buckets can also vary. At step 1215, the new extent is given a lifetime value. This lifetime value is set by taking the lowest lifetime value of the old extents that are the source of the data in the new extent and incrementing that lifetime value by one count.

The garbage collection process described above organizes data in a storage system based on expected endurance requirements. Accordingly, at step 1220 the new extents are placed on storage media by lifetime value: extents with relatively larger lifetime values are placed on lower endurance media, and extents with relatively smaller lifetime values are placed on higher endurance media. As noted above, the distribution of available storage media by endurance can vary by implementation. For example, the data in the extents can be organized in binary manner, by high and low endurance requirements, or be organized by finer grained endurance requirements so that more than two endurance ranges are utilized for the storage media.

Figure 13:
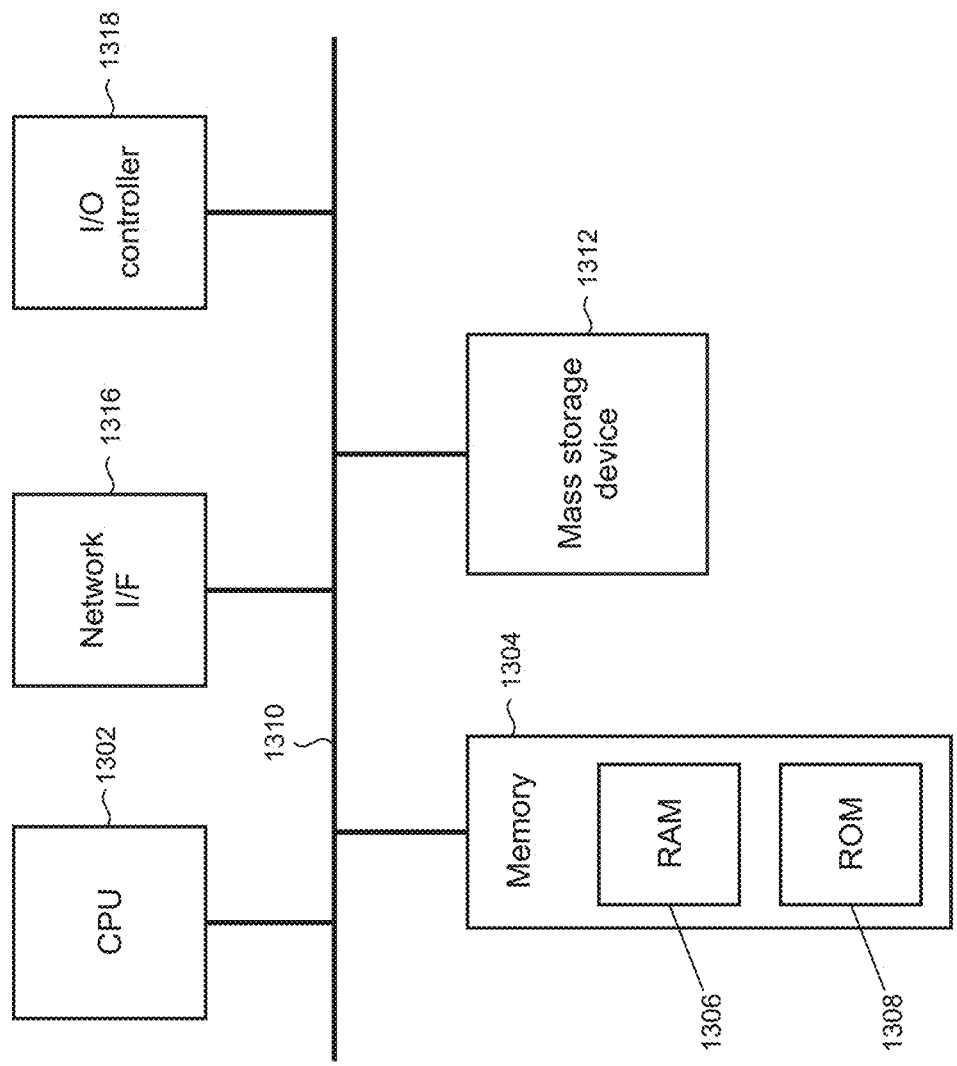
FIG. 13 is a block diagram of an illustrative computing device that may be used at least in part to implement the present optimized placement of data contained in a garbage collected storage system.

FIG. 13 shows an illustrative architecture 1300 for a device, such as a server, capable of executing the various components described herein for optimized placement of data in a garbage collected storage system. The architecture 1300 illustrated in FIG. 13 includes one or more processors 1302 (e.g., central processing unit, dedicated AI chip, graphic processing unit, etc.), a system memory 1304, including RAM (random access memory) 1306 and ROM (read only memory) 1308, and a system bus 1310 that operatively and functionally couples the components in the architecture 1300. A basic input/output system containing the basic routines that help to transfer information between elements within the architecture 1300, such as during startup, is typically stored in the ROM 1308. The architecture 1300 further includes a mass storage device 1312 for storing software code or other computer-executed code that is utilized to implement applications, the file system, and the operating system. The mass storage device 1312 is connected to the processor 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it may be appreciated by those skilled in the art that computer-readable storage media can be any available storage media that can be accessed by the architecture 1300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It may be appreciated that the network interface unit 1316 also may be utilized to connect to other types of networks and remote computer systems. The architecture 1300 also may include an input/output controller 1318 for receiving and processing input from a number of other devices, including a keyboard, mouse, touchpad, touchscreen, and control devices such as buttons and switches or electronic stylus (not shown in FIG. 13). Similarly, the input/output controller 1318 may provide output to a display screen, user interface, a printer, or other type of output device (also not shown in FIG. 13).

It may be appreciated that the software components described herein may, when loaded into the processor 1302 and executed, transform the processor 1302 and the overall architecture 1300 from a general-purpose computing system into a special-purpose computing system customized to facilitate the functionality presented herein. The processor 1302 may be constructed from any number of transistors or other discrete circuit elements, which may individually or collectively assume any number of states. More specifically, the processor 1302 may operate as a finite-state machine, in response to executable instructions contained within the software modules disclosed herein. These computer-executable instructions may transform the processor 1302 by specifying how the processor 1302 transitions between states, thereby transforming the transistors or other discrete hardware elements constituting the processor 1302.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1300 in order to store and execute the software components presented herein. It also may be appreciated that the architecture 1300 may include other types of computing devices, including wearable devices, handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Figure 14:
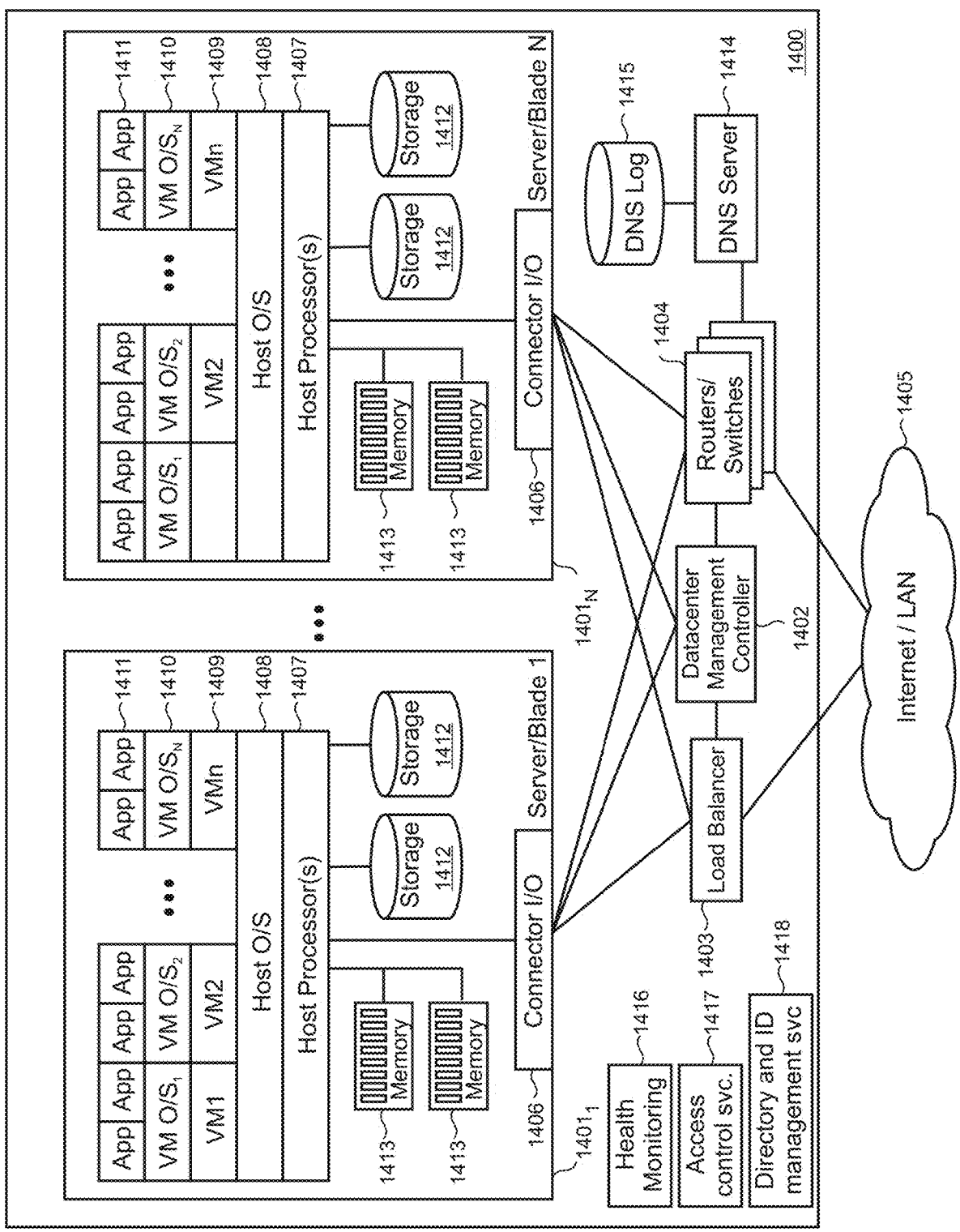
FIG. 14 is a block diagram of an illustrative datacenter that may be used at least in part to implement the present optimized placement of data contained in a garbage collected storage system.

FIG. 14 is a high-level block diagram of an illustrative datacenter 1400 that provides cloud computing services or distributed computing services that may be used to implement the present optimized placement of data contained in a garbage collected storage system. A plurality of servers 1401 are managed by datacenter management controller 1402. Load balancer 1403 distributes requests and computing workloads over servers 1401 to avoid a situation wherein a single server may become overwhelmed. Load balancer 1403 maximizes available capacity and performance of the resources in datacenter 1400. Routers/switches 1404 support data traffic between servers 1401 and between datacenter 1400 and external resources and users (not shown) via an external network 1405, which may be, for example, a local area network (LAN) or the Internet.

Servers 1401 may be standalone computing devices, and/or they may be configured as individual blades in a rack of one or more server devices. Servers 1401 have an input/output (I/O) connector 1406 that manages communication with other database entities. One or more host processors 1407 on each server 1401 run a host operating system (O/S) 1408 that supports multiple virtual machines (VM) 1409. Each VM 1409 may run its own O/S so that each VM O/S 1410 on a server is different, or the same, or a mix of both. The VM O/Ss 1410 may be, for example, different versions of the same O/S (e.g., different VMs running different current and legacy versions of the Windows® operating system). In addition, or alternatively, the VM O/Ss 1410 may be provided by different manufacturers (e.g., some VMs running the Windows® operating system, while other VMs are running the Linux® operating system). Each VM 1409 may also run one or more applications (App) 1411. Each server 1401 also includes storage 1412 (e.g., hard disk drives (HDD)) and memory 1413 (e.g., RAM) that can be accessed and used by the host processors 1407 and VMs 1409 for storing software code, data, etc. In one embodiment, a VM 1409 may employ the data plane APIs as disclosed herein.

Datacenter 1400 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1400 allows tenants to scale up or scale down resources dynamically to meet the current needs of their business. Additionally, a datacenter operator can provide usage-based services to tenants so that they pay for only the resources they use, when they need to use them. For example, a tenant may initially use one VM 1409 on server 1401$_1$ to run their applications 1411. When demand for an application 1411 increases, the datacenter 1400 may activate additional VMs 1409 on the same server 1401$_1$ and/or on a new server 1401N as needed. These additional VMs 1409 can be deactivated if demand for the application later drops.

Datacenter 1400 may offer guaranteed availability, disaster recovery, and back-up services. For example, the datacenter may designate one VM 1409 on server 1401$_1$ as the primary location for the tenant's application and may activate a second VM 1409 on the same or a different server as a standby or back-up in case the first VM or server 1401$_1$ fails. Database management controller 1402 automatically shifts incoming user requests from the primary VM to the back-up VM without requiring tenant intervention. Although datacenter 1400 is illustrated as a single location, it will be understood that servers 1401 may be distributed to multiple locations across the globe to provide additional redundancy and disaster recovery capabilities. Additionally, datacenter 1400 may be an on-premises, private system that provides services to a single enterprise user or may be a publicly accessible, distributed system that provides services to multiple, unrelated customers and tenants or may be a combination of both.

Domain Name System (DNS) server 1414 resolves domain and host names into IP addresses for all roles, applications, and services in datacenter 1400. DNS log 1415 maintains a record of which domain names have been resolved by role. It will be understood that DNS is used herein as an example and that other name resolution services and domain name logging services may be used to identify dependencies. For example, in other embodiments, IP or packet sniffing, code instrumentation, or code tracing.

Datacenter health monitoring 1416 monitors the health of the physical systems, software, and environment in datacenter 1400. Health monitoring 1416 provides feedback to datacenter managers when problems are detected with servers, blades, processors, or applications in datacenter 1400 or when network bandwidth or communications issues arise.

Access control service 1417 determines whether users are allowed to access particular connections and services supported by the datacenter. Directory and identity management service 1418 authenticates user credentials for tenants on datacenter 1400.

Figure 15:
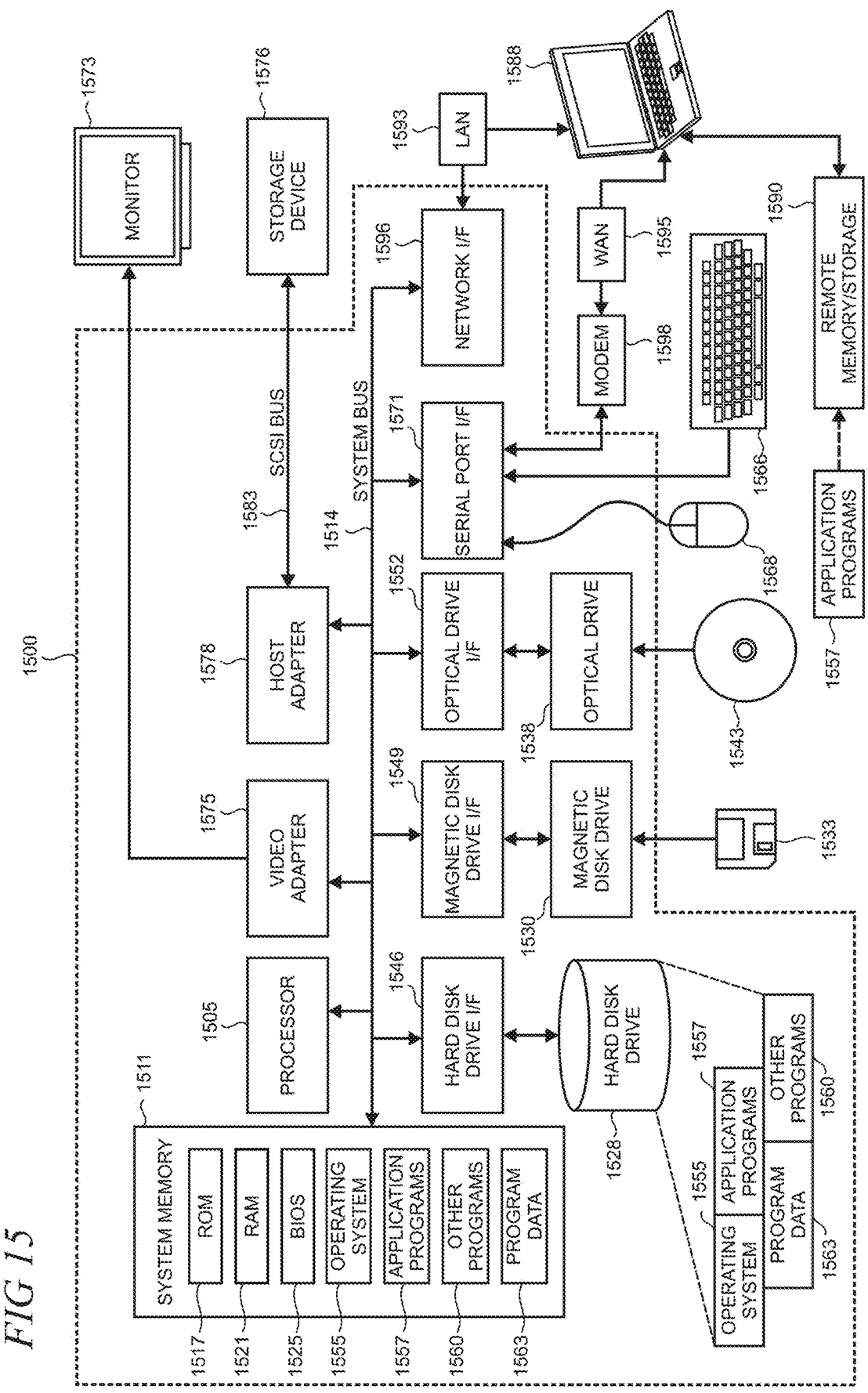
FIG. 15 is a simplified block diagram of an illustrative computing device that may be used at least in part to implement the present optimized placement of data contained in a garbage collected storage system.

FIG. 15 is a simplified block diagram of an illustrative computer system 1500 such as a PC, client machine, or server with which the present optimized placement of data contained in a garbage collected storage system may be implemented. Computer system 1500 includes a processor 1505, a system memory 1511, and a system bus 1514 that couples various system components including the system memory 1511 to the processor 1505. The system bus 1514 may be any of several types of bus structures including a memory bus or memory controller, a peripheral bus, or a local bus using any of a variety of bus architectures. The system memory 1511 includes read only memory (ROM) 1517 and random access memory (RAM) 1521. A basic input/output system (BIOS) 1525, containing the basic routines that help to transfer information between elements within the computer system 1500, such as during startup, is stored in ROM 1517. The computer system 1500 may further include a hard disk drive 1528 for reading from and writing to an internally disposed hard disk (not shown), a magnetic disk drive 1530 for reading from or writing to a removable magnetic disk 1533 (e.g., a floppy disk), and an optical disk drive 1538 for reading from or writing to a removable optical disk 1543 such as a CD (compact disc), DVD (digital versatile disc), or other optical media. The hard disk drive 1528, magnetic disk drive 1530, and optical disk drive 1538 are connected to the system bus 1514 by a hard disk drive interface 1546, a magnetic disk drive interface 1549, and an optical drive interface 1552, respectively. The drives and their associated computer-readable storage media provide non-volatile storage of computer-readable instructions, data structures, program modules, and other data for the computer system 1500. Although this illustrative example includes a hard disk, a removable magnetic disk 1533, and a removable optical disk 1543, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present optimized placement of data contained in a garbage collected storage system. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk 1533, optical disk 1543, ROM 1517, or RAM 1521, including an operating system 1555, one or more application programs 1557, other program modules 1560, and program data 1563. A user may enter commands and information into the computer system 1500 through input devices such as a keyboard 1566 and pointing device 1568 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1505 through a serial port interface 1571 that is coupled to the system bus 1514, but may be connected by other interfaces, such as a parallel port, game port, or universal serial bus (USB). A monitor 1573 or other type of display device is also connected to the system bus 1514 via an interface, such as a video adapter 1575. In addition to the monitor 1573, personal computers typically include other peripheral output devices (not shown), such as speakers and printers. The illustrative example shown in FIG. 15 also includes a host adapter 1578, a Small Computer System Interface (SCSI) bus 1583, and an external storage device 1576 connected to the SCSI bus 1583.

The computer system 1500 is operable in a networked environment using logical connections to one or more remote computers, such as a remote computer 1588. The remote computer 1588 may be selected as another personal computer, a server, a router, a network PC, a peer device, or other common network node, and typically includes many or all of the elements described above relative to the computer system 1500, although only a single representative remote memory/storage device 1590 is shown in FIG. 15. The logical connections depicted in FIG. 15 include a local area network (LAN) 1593 and a wide area network (WAN) 1595. Such networking environments are often deployed, for example, in offices, enterprise-wide computer networks, intranets, and the Internet.

When used in a LAN networking environment, the computer system 1500 is connected to the local area network 1593 through a network interface or adapter 1596. When used in a WAN networking environment, the computer system 1500 typically includes a broadband modem 1598, network gateway, or other means for establishing communications over the wide area network 1595, such as the Internet. The broadband modem 1598, which may be internal or external, is connected to the system bus 1514 via a serial port interface 1571. In a networked environment, program modules related to the computer system 1500, or portions thereof, may be stored in the remote memory storage device 1590. It is noted that the network connections shown in FIG. 15 are illustrative and other means of establishing a communications link between the computers may be used depending on the specific requirements of an application of the present optimized placement of data contained in a garbage collected storage system.

Various exemplary embodiments of the present optimized placement of data contained in a garbage collected storage system are now presented by way of illustration and not as an exhaustive list of all embodiments. An example includes a computing device, comprising: a non-transitory data storage system including at least a first storage medium and a second storage medium, the first storage media having higher endurance relative to the second storage medium; or more processors; and at least one hardware-based non-transitory computer-readable memory device having computer-executable instructions stored thereon which, when executed by the one or more processors, cause the computing device to track lifetime of data in each extent in the data storage system, in which lifetime is a number of garbage collection cycles for which an extent has been persisted, initiate a garbage collection cycle, coalesce extents existing at the initiation of the garbage collection cycle into new extents created during the garbage collection cycle so that each new extent contains data of similar lifetime, place the new extents on the data storage system according to lifetime, such that new extents having lower lifetime values relative to other new extents are placed on the first storage medium, and the other new extents are placed on the second storage medium.

In another example, the instructions further cause the computing device to repeat the coalescing and placing for each garbage collection cycle. In another example, the lifetime is expressed as an integer count, and the instructions further cause the computing device to assign a lifetime value to each new extent, in which the lifetime value is a lowest value of the existing extents that are coalesced into the new extent plus one count. In another example, the data storage system comprises a plurality of storage media that each have different endurance characteristics and the instructions further cause the computing device to place new extents on the storage media based on endurance in which relatively lower lifetime values are associated with relatively higher endurance. In another example, the data storage system comprises tiered storage using one or more solid state drives. In another example, the data storage system comprises shingled magnetic recording (SMR) media. In another example, the data storage system comprises at least one storage media implemented using a NAND-based memory device.

A further example includes a method for placing data in extents on a plurality of storage media with varying endurance during each cycle of a garbage collection process, comprising: tracking a lifetime of each extent using an integer counter, in which the counter is incremented for each garbage collection cycle that the extent is persisted; garbage collecting old extents into new extents so that data in each new extent is sourced from old extents having similar lifetime values; assigning a lifetime value for each new extent, in which the assigned lifetime value is equal to a lowest lifetime value of the old source extents plus one increment on the integer counter; and placing the new extents on the plurality of storage media so that new extents having higher lifetime values relative to those of other new extents are placed on storage media having lower endurance relative to that of other storage media in the plurality, and new extents having lower lifetime values relative to those of other new extents are placed on storage media having higher endurance relative to that of other storage media in the plurality.

In another example, the method further comprises sorting the extents by lifetime value. In another example, the sorting comprises organizing the extents by expected endurance requirements. In another example, the method further includes triggering a garbage collection cycle to meet predetermined free space criteria. In another example, the method further includes performing wear leveling operations on the plurality of storage media during the garbage collection. In another example, one or more of the plurality of storage media comprises a solid state memory device. In another example, the solid state memory comprises flash memory elements that are subject to wear.

A further example includes one or more hardware-based non-transitory computer-readable memory devices storing computer-executable instructions which, upon execution by one or more processors in a computing device that includes a data storage system, cause the computing device to attach metadata to each data fragment that is stored in the data storage system in which the metadata provides a counter to count a number of garbage collection cycles that each data fragment has undergone; sort the stored data fragments using the counter in each cycle of garbage collection; distribute the sorted data fragments, in each cycle of garbage collection, into at least two buckets such that data fragments with higher relative counts are in one bucket, and data fragments with lower relative counts are in the other bucket; and in each cycle of garbage collection, place the bucketed data fragments on different respective storage media, in which the storage media have respective different levels of endurance.

In another example, the instructions further cause the computing device to repeat the sorting, distributing, and placing each time the garbage collection is triggered. In another example, the levels of endurance include higher relative endurance and lower relative endurance. In another example, the data storage system comprises solid state storage media and magnetic storage media. In another example, bucketed data fragments having relatively highest churn are placed on storage media having relatively highest endurance. In another example, bucketed data fragments having relatively highest stability are placed on storage media having relatively lowest endurance.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A computing device, comprising:
a non-transitory data storage system including at least a first storage medium and a second storage medium, the first storage medium having higher endurance relative to the second storage medium, in which each of the first and second storage media is discretely embodied and each uses a different type of memory element;
one or more processors; and
at least one hardware-based non-transitory computer-readable memory device having computer-executable instructions stored thereon which, when executed by the one or more processors, cause the computing device to
track lifetime of data in each extent in the data storage system, in which lifetime is a number of garbage collection cycles for which an extent has been persisted,
initiate a garbage collection cycle,
coalesce extents existing at the initiation of the garbage collection cycle into new extents created during the garbage collection cycle so that each new extent contains data of similar lifetime,
place the new extents on the data storage system according to lifetime, such that new extents having lower lifetime values relative to other new extents are placed on the first storage medium, and the other new extents are placed on the second storage medium.

2. The computing device of claim 1 in which the instructions further cause the computing device to repeat the coalescing and placing for each garbage collection cycle.

3. The computing device of claim 1 in which the lifetime is expressed as an integer count, and the instructions further cause the computing device to assign a lifetime value to each new extent, in which the lifetime value is a lowest value of the existing extents that are coalesced into the new extent plus one count.

4. The computing device of claim 1 in which the data storage system comprises a plurality of storage media that each have different endurance characteristics and the instructions further cause the computing device to place new extents on the storage media based on endurance in which relatively lower lifetime values are associated with relatively higher endurance.

5. The computing device of claim 1 in which the data storage system comprises tiered storage using one or more solid state drives.

6. The computing device of claim 1 in which the data storage system comprises shingled magnetic recording (SMR) media.

7. The computing device of claim 1 in which the data storage system comprises at least one storage media implemented using a NAND-based memory device.

8. A method for placing data in extents on a plurality of storage media with varying endurance during each cycle of a garbage collection process, comprising:
tracking a lifetime of each extent using an integer counter, in which the counter is incremented for each garbage collection cycle that the extent is persisted;
garbage collecting old extents into new extents so that data in each new extent is sourced from old extents having similar lifetime values;
assigning a lifetime value for each new extent, in which the assigned lifetime value is equal to a lowest lifetime value of the old source extents plus one increment on the integer counter;
providing the plurality of storage media to utilize different types of memory elements to implement respective different levels of endurance, in which a storage medium using a first type of memory element is discretely embodied from a storage medium using a second type of memory element; and
placing the new extents on the plurality of storage media so that new extents having higher lifetime values relative to those of other new extents are placed on storage media having lower endurance relative to that of other storage media in the plurality, and new extents having lower lifetime values relative to those of other new extents are placed on storage media having higher endurance relative to that of other storage media in the plurality.

9. The method of claim 8 further comprising sorting the extents by lifetime value.

10. The method of claim 9 in which the sorting comprises organizing the extents by expected endurance requirements.

11. The method of claim 8 further including triggering a garbage collection cycle to meet predetermined free space criteria.

12. The method of claim 8 further including performing wear leveling operations on the plurality of storage media during the garbage collection.

13. The method of claim 8 in which one or more of the plurality of storage media comprises a solid state memory device.

14. The method of claim 13 in which the solid state memory device comprises flash memory elements that are subject to wear.

15. One or more hardware-based non-transitory computer-readable memory devices storing computer-executable instructions which, upon execution by one or more processors in a computing device that includes a data storage system, cause the computing device to
attach metadata to each data fragment that is stored in the data storage system in which the metadata provides a counter to count a number of garbage collection cycles that each data fragment has undergone;
sort the stored data fragments using the counter in each cycle of garbage collection;

distribute the sorted data fragments, in each cycle of garbage collection, into at least two buckets such that data fragments with higher relative counts are in one bucket, and data fragments with lower relative counts are in the other bucket; and in each cycle of garbage collection, place the bucketed data fragments on different respective storage media, in which the storage media have respective different levels of endurance, in which the storage media utilize different types of memory elements to implement respective different levels of endurance, and in which a storage medium using a first type of memory element is discretely embodied from a storage medium using a second type of memory element.

16. The one or more hardware-based non-transitory computer-readable memory devices of claim 15 in which the instructions further cause the computing device to repeat the sorting, distributing, and placing each time the garbage collection is triggered.

17. The one or more hardware-based non-transitory computer-readable memory devices of claim 15 in which the levels of endurance include higher relative endurance and lower relative endurance.

18. The one or more hardware-based non-transitory computer-readable memory devices of claim 15 in which the data storage system comprises solid state storage media and magnetic storage media.

19. The one or more hardware-based non-transitory computer-readable memory devices of claim 15 in which bucketed data fragments having relatively highest churn are placed on storage media having relatively highest endurance.

20. The one or more hardware-based non-transitory computer-readable memory devices of claim 15 in which bucketed data fragments having relatively highest stability are placed on storage media having relatively lowest endurance.

* * * * *